United States Patent [19] — [11] 4,392,771
Smalley — [45] Jul. 12, 1983

[54] LIFT SAFETY SWITCH SYSTEM

[75] Inventor: Raymond L. Smalley, Carey, Ohio

[73] Assignee: REB Manufacturing, Inc., Carey, Ohio

[21] Appl. No.: 218,613

[22] Filed: Dec. 22, 1980

[51] Int. Cl.³ .......... B60P 1/46

[52] U.S. Cl. .......... 414/545; 91/419; 187/41; 192/133; 414/921; 414/674

[58] Field of Search .......... 187/40, 41; 414/539, 414/540, 545, 921, 674; 49/28; 192/130, 133, 134; 100/53, 256; 91/216 A, 419, 217, 433

[56] References Cited

U.S. PATENT DOCUMENTS

| | | | |
|---|---|---|---|
| 1,828,860 | 10/1931 | Conklin | 49/28 X |
| 4,056,203 | 11/1977 | Meldahl et al. | 414/540 |
| 4,071,152 | 1/1978 | Kinkead et al. | 414/545 |

*Primary Examiner*—Robert G. Sheridan
*Attorney, Agent, or Firm*—Hugh A. Kirk

[57] ABSTRACT

An electrically controlled hydraulic lift, such as wheelchair lifts for vehicles, wherein the hydraulic reciprocating motor for operating the platform of the lift is mounted in a vertical slot so that any obstruction in the downward movement of the platform of the lift will cause the reciprocating motor to rise in the slot and operate a microswitch to automatically shut off the continued supply of fluid to the reciprocating motor. This arrangement not only prevents the crushing of obstacles that get in the downward path of the platform, but also limits the downward movement of the platform when it contacts the solid ground or floor level from which an object is to be lifted, such as an invalid in a wheelchair. If desired, the upward movement of the reciprocating hydraulic motor may be restricted by resilient means for maintaining it in the lower part of its mounting slot. The electrical control system for the supply of hydraulic pressure fluid to the reciprocating motor may also include a limit switch along the vertical path of movement of the platform. The fluid pressure supply may comprise an integral hydraulic pump and electric motor assembly unit having high and low pressure fluid outlets for respectively operating the reciprocating motor for raising and lowering the lift platform.

3 Claims, 6 Drawing Figures

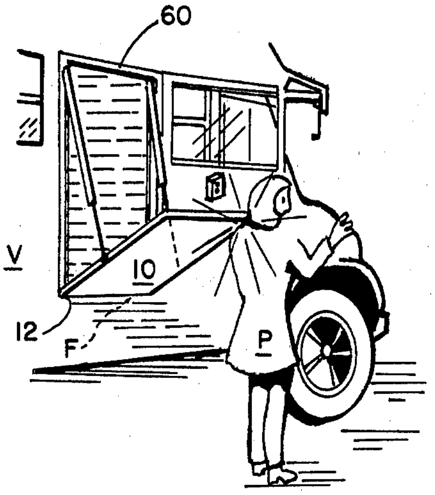
FIG. II
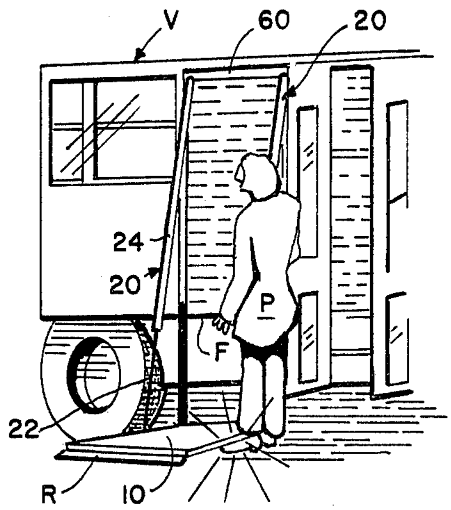
FIG. III
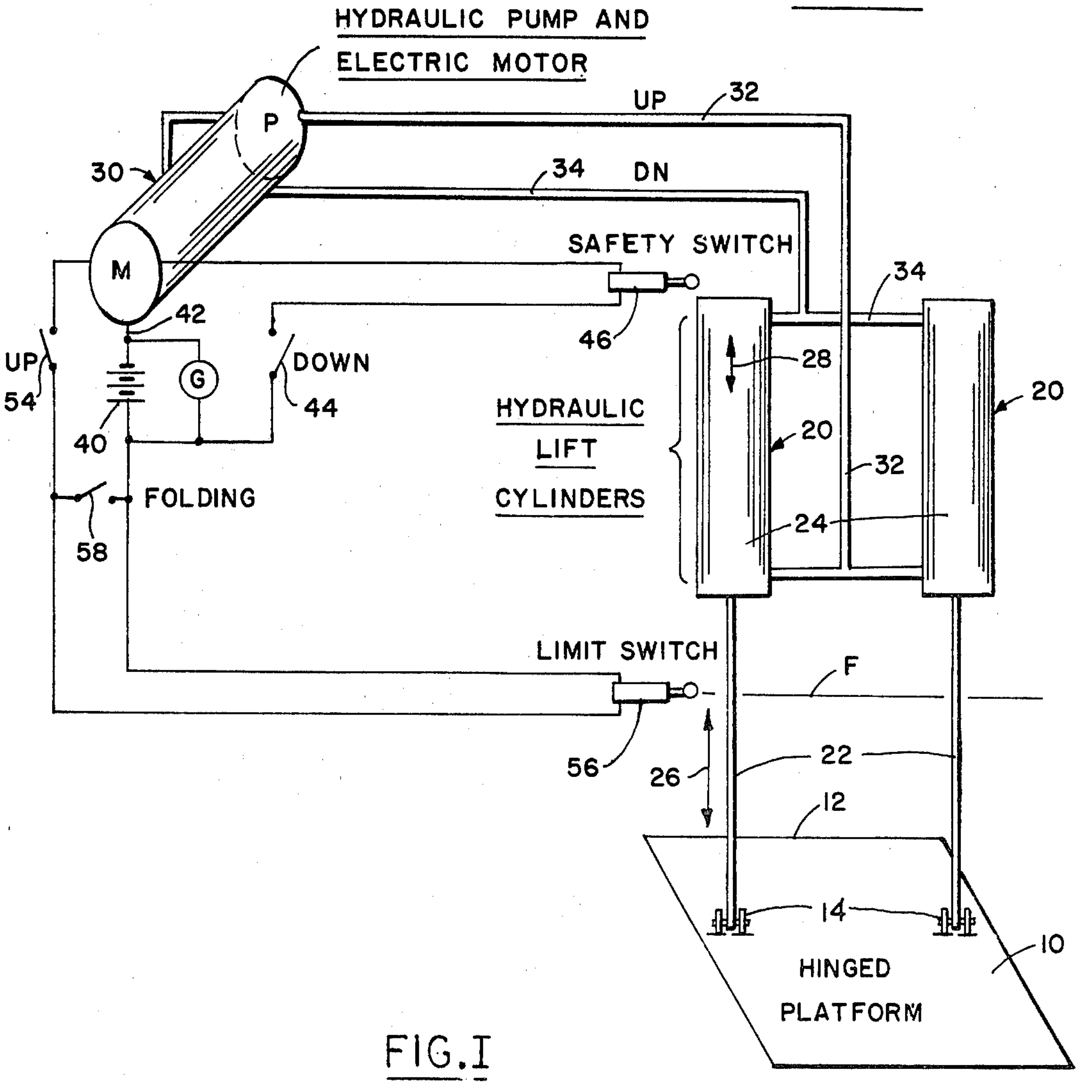
FIG. I

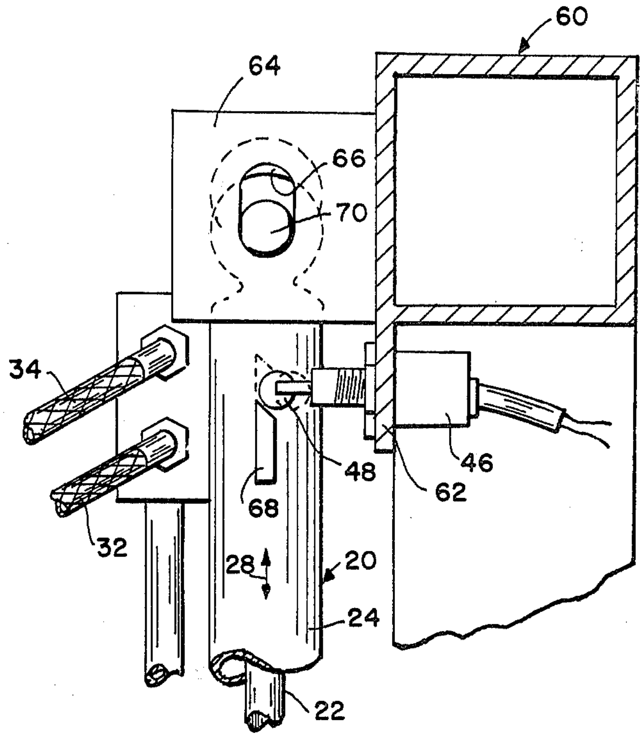
FIG. IV
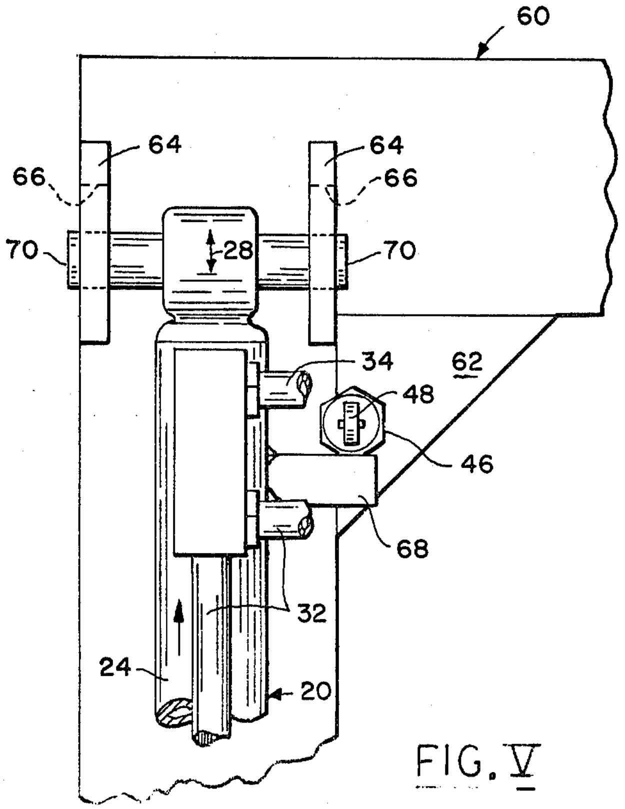
FIG. V

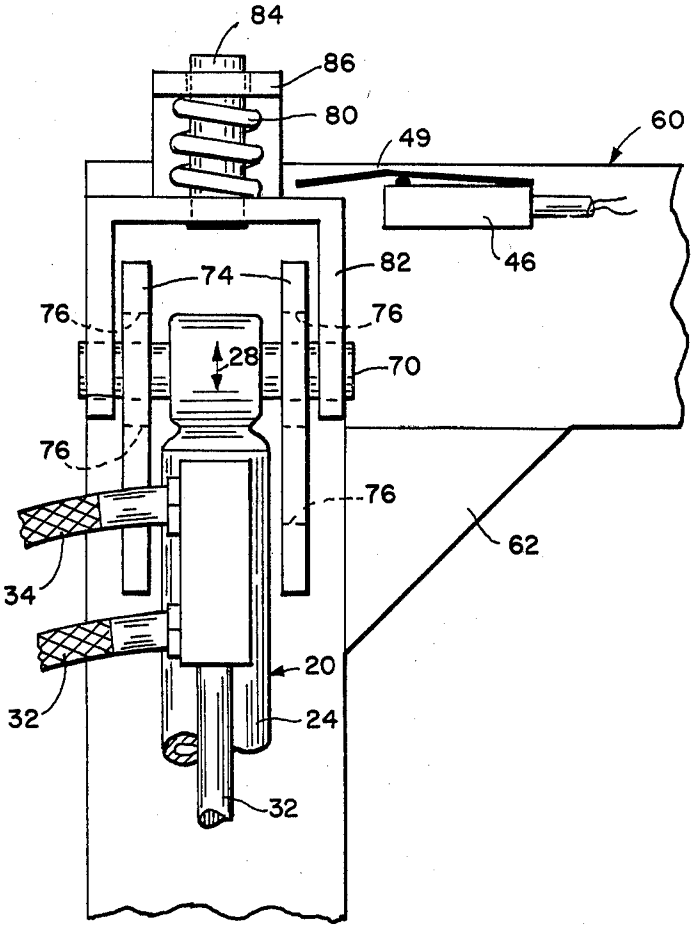
FIG. VI

LIFT SAFETY SWITCH SYSTEM

The system of this invention is an improvement in the lift shown in applicant's joint U.S. Pat. No. 4,056,203 issued Nov. 1, 1977.

BACKGROUND OF THE INVENTION

Obstruction-operated microswitches are well known in the art for controlling machines as shown in:

Lund U.S. Pat. No. 1,931,232 Oct. 17, 1933 Class 192/116.5

Coats U.S. Pat. No. 3,226,998 Jan. 4, 1966 Class 74/526 for controlling presses as shown in:

Carlyle U.S. Pat. No. 2,400,486 May 21, 1946 Class 192/134

Considine et al. U.S. Pat. No. 3,861,297 Jan. 21, 1975 Class 100/53

Lieber U.S. Pat. No. 4,060,160 Nov. 29, 1977 Class 192/134 for controlling doors and gates as shown in:

Curtis U.S. Pat. No. 3,012,520 Dec. 12, 1961 Class 104/235

Bidelman et al. U.S. Pat. No. 3,378,952 Apr. 23, 1968 Class 49/360

Daugirdas Pat. No. 3,844,062 Oct. 29, 1974 Class 49/28

Popper et al. U.S. Pat. No. 3,955,661 May 11, 1976 Class 192/150

Baump et al. U.S. Pat. No. 3,975,861 Aug. 24, 1976 Class 49/28 for controlling feed mechanisms as shown in:

Koch U.S. Pat. No. 2,679,307 May 25, 1954 Class 192/127

Dollheimer et al. U.S. Pat. No. 3,246,526 Apr. 19, 1966 Class 74/1

Netta et al. U.S. Pat. No. 3,250,870 May 10, 1966 Class 200/61.41

Bleiman U.S. Pat. No. 3,354,273 Nov. 21, 1967 Class 200/61.41

Beebe U.S. Pat. No. 3,502,827 Mar. 24, 1970 Class 200/61.13

Also it is well known that to have mechanical, that is non-electrical, obstruction operators with levers, springs and slot structures as disclosed in:

Conklin U.S. Pat. No. 1,949,645 Mar. 6, 1934 Class 268/66

Lorentzen U.S. Pat. No. 2,306,785 Dec. 29, 1942 Class 192/134

Chmelar U.S. Pat. No. 2,642,973 Class 192/134

Cornell, Jr. U.S. Pat. No. 3,143,957 Aug. 11, 1964 Class 100/53

Nevertheless, applicant's specific structure for the movable mounting of a reciprocating hydraulic motor in which the whole motor is movable when an obstruction is contacted in its downward movement path, was not known to applicant, particularly for the specific use as a safety feature for hydraulic lifts for wheelchairs mounted in vehicles, so that in lowering the lift no one could be seriously injured if they happened to be in the path of the downward movement of the lift platform.

SUMMARY OF THE INVENTION

Generally speaking, the wheelchair lifts for vehicles embodying the safety control switch system of this invention comprise a platform which is raised and lowered by a pair of parallel double-acting hydraulic cylinder and piston reciprocating motors which are pivotally connected at their lower ends to a hinged platform and are pivotally connected at their upper supporting ends to a frame mounted in an opening in the wall of a vehicle. The reciprocating hydraulic motors not only raise and lower the platform between the ground and the floor level of the vehicle, but also may operate to fold up the platform into a vertical position to close the doorway as well as to swing the platform clear of the side of the vehicle. Such a vehicle lift is disclosed in the above mentioned U.S. Pat. No. 4,056,203 assigned to the same assignee as this invention and patent application.

The improved feature of this particular lift according to this invention comprises mounting the upper pivots for the reciprocating hydraulic motors in vertical slots in the frame so that in their downward movement any obstruction in the downward path of the platform would cause the motors to raise in their supporting slots. This rise or vertical movement of the motors would operate a safety microswitch mounted on the frame by the finger, feeler or sensing member of the mocroswitch being engaged by contact with a portion of the hydraulic cylinder or a cam mounted thereon. The operation or opening of the electric current through this microswitch would immediately and automatically stop further downward movement of the platform by causing the pressurized fluid to the reciprocating motors to be shut off or stopped. This shutting off of pressurized fluid may be by stopping the electric motor that drives the fluid pump, or by operating a bypass solenoid valve in the hydraulic system, or it may even reverse the flow of the pressurized fluid to the reciprocating hydraulic motors to raise the platform.

Although the weight of the empty platform is generally sufficient to maintain the upper pivoted connection of the hydraulic reciprocating motors at the lower ends of their mounting slots, this may be insured by the addition of a resilient means, such as a spring, which must be counteracted by an obstructing object in the path of downward movement of the platform.

Besides the safety microswitch, the electrical control system for the lift may comprise three manual pushbuttons or toggle switches and a limit switch. The manual switches may be mounted in a box connected to a flexible electric conducting cable so that the box can be easily moved or located for operation either by a person inside or outside the vehicle, or on the lift itself. One manual switch is the "up" button which causes a higher hydraulic pressure fluid from the pump motor to be applied to both of the parallel cylinders to raise the platform. This raising may be stopped automatically by a limit switch that is contacted as soon as the platform becomes level with the floor of the vehicle. Another manual switch is the "down" button which causes a lower hydraulic pressure fluid from the pump motor to be applied to the parallel cylinders to lower the platform. The lowering is automatically stopped by the safety switch of this invention when the platform contacts the ground or floor or a solid object in its downward path. A higher pressure for this downward movement is not necessary in that the weight of the platform and/or any object thereon aids in the operation of the cylinders, and the lower fluid pressure supplied to them insures a slow and even descent of the platform.

The third manual switch or button on the box is an "override" button for the high pressure upward movement of the platform which bridges the platform limit switch and permits the further raising of the platform around its hinged edge to fold it into a vertical position over the opening surrounded by the frame supporting the lift. This further upper movement is limited by the pistons reaching the ends of their cylinders, and thus no further control switches are required.

These electrical switches control a DC electric motor which is driven from an electric current supply source of the vehicle, such as a 12-volt DC storage battery and/or alternator. This electric motor is directly mechanically connected to a hydraulic pump which has separate outlets and solenoid valves built into an assembly motor-pump unit for automatically controlling the high and low pressures for the up-and-down movements of the lift platform, respectively.

OBJECTS AND ADVANTAGES

It is an object of this invention to produce an efficient, effective, simple, economic and safe hydraulic lift and electrical control system therefor such as may be employed for wheelchair lifts on vehicles.

Another object is to provide such a hydraulic lift which will automatically be stopped in its downward movement if it or any part thereof contacts an obstruction in its path of downward movement, so as to prevent damage to both the obstructing object as well as to the lift itself. Thus, if a person is walking by the lift or standing too close to it when it is being unfolded from the wall of the vehicle and lowered for use by an invalid in a wheelchair, it will not seriously injure the person, in that as soon as any part of the lowering platform, even while it is being unfolded, contacts the part of the body of the person, it will immediately stop further downward movement.

Another object is to provide such a lift in which any obstruction in the downward path thereof, including the ground or floor itself, will automatically cause the lift to stop its further downward movement.

BRIEF DESCRIPTION OF THE VIEWS

The above mentioned and other features, objects and advantages, and a manner of attaining them are described more specifically below by reference to embodiments of this invention shown in the accompanying drawings wherein:

FIG. 1 is a schematic flow diagram of the electrical and hydraulic currents of a safety switch control system for a lift according to a preferred embodiment of this invention;

FIGS. II and III are perspective views of persons being contacted by the downward movement of the platform of a wheelchair lift on a vehicle; FIG. II showing the unfolding of the platform contacting the shoulder of a person and FIG. III showing the lowering of the platform contacting a person's foot before the platform completely reaches the ground. In both instances the automatic safety switch of this invention would be operated to prevent injury to these persons;

FIG. IV is an enlarged side elevational view of an upper slotted pivotal mounting for one of the pair of hydraulic reciprocating motors employed in raising and lowering the lift shown in FIGS. I through III, showing a portion of the lift's frame in the vehicle, the upper portion of an hydraulic cylinder, and the safety microswitch mounted on the frame for engagement with a cam welded to the side of the hydraulic cylinder;

FIG. V is a front elevational view of the embodiment shown in FIG. IV; and

FIG. VI is a view similar to FIG. V of another embodiment of this invention showing a resilient means for urging the cylinder into the lower end of its slotted mounting.

DETAILED DESCRIPTION OF PREFERRED EMBODIMENTS

Referring first to the whole general system of this invention as schematically shown in FIG. I, there is disclosed a platform 10 which may be hinged along its rear edge 12 to a vertically movable and swinging frame (not shown), connected by aligned pivots 14 intermediate its front and rear edges to a pair of piston rods 22 reciprocable in a pair of hydraulic cylinders 24 of the pair of reciprocating hydraulic motors 20. These motors 20 raise and lower this platform 10 a distance limited by the length of the piston rods 22 and their movement inside the cylinders 24, such as schematically indicated by the long double-ended arrow 26. The important feature of this invention is that the motors 20 including the cylinders 24 also are vertically movable, but only slightly as indicated by the shorter double-ended arrow 28.

A hydraulic pump P and electric motor M assembly 30 is connected by means of a higher pressure hydraulic duct 32 to the lower ends of the cylinders 24 and by a lower pressure hydraulic duct 34 to the upper ends of the cylinders 24.

The electric motor M of the assembly 30, as well as solenoid valves therein (not shown), is controlled by an electrical circuit from a power source, such as a battery 40 and/or generator G that is connected on one side via conductor 42 to the electric motor M as well as to solenoid valves inside the assembly 30. The other side of the power source or battery 40 is connected to a manual "down" switch 44 in series with the safety microswitch 46 to the assembly 30. This other side of the power source or battery 40 also is connected to a manual "up" switch 54 in series with a limit switch 56, which limit switch 56 may be bypassed by an additional pushbutton switch 58 for overriding the limit switch 56 to further raise the platform to fold it into its vertical position as partially shown in FIG. II.

Assuming that the lift is installed in the side of a school bus V for students who must use a wheelchair, and the bus V has just stopped and the lift is in its raised and folded position; the operator of the lift pushes the "down" button 44 which first applies low pressure hydraulic fluid through duct 34 to the upper ends of the reciprocating hydraulic motor cylinders 24 to first unfold the platform 10 from the side of the school bus or vehicle V and lower it from its vertical position as shown in FIG. II. In the event that the unfolding and/or downward movement of the platform 10 causes the platform 10 to contact an obstacle or person P as shown in FIG. II or III, before the platform reaches the ground, and when the platform contacts the ground, such obstructions of the further downward movement of the platform 10 causes the cylinders 24 to raise slightly as indicated in FIG. I by arrow 28. This raising of the cylinder 24 is because they are mounted in vertical slots 66, or 76 as shown in FIGS. IV through VI described later, and this slight upward movement operates the safety switch 46 to open the circuit to pump assembly 30 to control immediately the motor M and/or a solenoid valve therein to stop the application of further lower hydraulic pressure through the duct 34. If desired, the safety microswitch 46 may even cause the operation of another hydraulic solenoid valve in the assembly 30 to apply high pressure fluid to the duct 32 to raise the platform 10; that is to not only stop its downward movement, but also to move it in the opposite or upward direction away from the obstruction. This reverse movement, however, only would occur automatically between the limits of travel of the platform 10 and would not operate when the platform engaged the ground. Such a reversing system could be inactivated by a switch operated by the ground-contacting lever of a safety ramp R on the front outer edge of the platform 10 (see FIG. III). As shown in FIGS. II and III, after the platform has unfolded to its horizontal position, it is then moved outwardly from the vehicle and its frame 60 before it is moved downwardly in a horizontal position parallel to that shown in FIG. III. This operation of such a lift is disclosed in more detail in the above mentioned applicant's joint U.S. Pat. No. 4,056,203.

In order to raise the platform 10 from its lower-most position adjacent that shown in FIG. III, the "up" button 54 in the electric control circuit is operated, which energizes the electric motor M in the pump motor assembly 30 and/or applies high pressure fluid through the duct 32 to the lower ends of the hydraulic cylinders 24 of the reciprocating motors 20 to raise the platform 10 until it becomes level with the floor F of the vehicle at which time it contacts limit switch 56 that automatically stops the motor generator and/or the application of further high pressure to the cylinders 24. This permits the person in the wheelchair to move off (or on) of the platform 10 from or into the vehicle V. After the platform 10 has been cleared, then it is folded up vertically by further upward movement of the pistons 22 into the cylinders 24 under the higher pressure fluid in the duct 32, which is controlled by the manual bypassing folding switch 58, which also is a button on the control box for the lift mechanism. When the pistons 22 get to their upper limits if their travel, the platform 10 is then completely folded into its vertical position and no more upward movement can occur.

Referring now to the specific embodiment disclosed in FIGS. IV and V, part of the stationary frame 60 mounted around the opening in the side of the vehicle V is disclosed, namely the upper corner thereof in which the vertical and horizontal beams may be more rigidly connected by a triangular gusset plate 62 upon which may be mounted the microswitch 46. The high and low pressure, or up and down, fluid pressure supply ducts 32 and 34 to the cylinders 24 of the hydraulic reciprocating motors 20 also are shown in FIGS. IV through VI. Anchored or welded to the corner of the frame are a pair of vertical parallel mounting brackets or ears 64 having aligned vertical slots 66 therein into which the trunnion ends at the upper ends of the cylinders 24 are pivotally journalled for mounting and supporting the swingable frame for the reciprocating motors 20 and the platform 10. Projecting radially outwardly from one side of the cylinder 24 is a finger or cam 68 which engages the end roller 48 of the microswitch 46 to operate the microswitch and open the circuit through the "down" button 44 when the cylinder 24 moves upwardly in the slot 66. This occurs when the downward movement of platform 10 contacts an obstruction. Because of the weight of the platform and the reciprocating hydraulic motors 20, it is generally not necessary to provide additional means for urging the trunnions 70 into the lower ends of their mounting slots 66. However, if desired, a resilient means such as a spring 80 as disclosed in the embodiment of FIG. VI may be employed to insure this position.

In FIG. VI the vertical ears 74, corresponding to the ears 64 in FIGS. IV and V, may be longer and have more than one vertically elongated slots 76 therein for use with different length cylinders 24 and/or pistons 22. The trunnion ends 70, however, in this embodiment extend further beyond the outsides of the pivotal mounting ears 74 and are connected into an inverted U-shaped bracket 82 which has a central upwardly extending pin 84 for mounting the compression spring 80. This compression spring 80 reacts against an L-bracket 86 attached such as by welding to the top of the frame 60. The microswitch 46 is mounted near the top of the frame 60 and has its outwardly extending arm 49 in the path of the vertical movement of the U-bracket 82, so that as soon as any obstruction is contacted by the platform 10 in the downward movement thereof by the motors 20, the cylinder 24 will move upwardly in the direction of the arrow 28 to move the U-bracket 82 upwardly to contact the finger 49 of the microswitch 48, and automatically stop the low pressure fluid supply to the cylinders 24.

Although the upper ends of the cylinders 20 are shown to be pivotally mounted in vertical slots 66 or 76, it should be clearly understood that any mounting for the reciprocating hydraulic motors 20 of the lift, regardless of its location, must be in vertical slots which would permit the slight upward movement of the motors 20 to operate a microswitch 46 to stop the further downward movement of the platform 10 connected to the reciprocating motors. Furthermore, it is not always essential that a resilient means 80 be employed to insure that the trunnions 70 are additionally urged toward the lower ends of their supporting slots 66 or 76, in that gravity may insure this location by the mere weight of the motors 20 and platform 10.

It also is to be understood that the hydraulic control mechanism for the pressure fluid to the reciprocating motors 20 may be valved inside the hydraulic pump and motor assembly 30 to bypass the fluid rather than stop the motor M, and the assembly may contain a reservoir through which the fluid may be circulated when not being forced through the ducts 32 or 34 to the reciprocating motors 20.

Furthermore, additional electrical control buttons may be provided in parallel with the manual switches 44, 54, and 58 in stationary positions outside and/or inside the vehicle V and/or at the driver's location and/or on the swingable frame for the platform 10 and motors 20 for operation by the wheelchair person, without departing from the scope of this invention.

While there is described above the principles of this invention in connection with specific apparatus, it is to be clearly understood that this description is made only by way of example and not as a limitation to the scope of this invention.

I claim:

1. In a fluid-operated lift comprising:

(A) a frame, (B) a platform vertically foldable and vertically movable relative to said frame, (C) a fluid-operated reciprocating motor comprising a cylinder and a piston in said cylinder, said motor being connected between said platform and said frame for moving said platform to and from a vertical folded to a horizontal position and to and from its highest horizontal position to its lowest horizontal position, (D) a source of power comprising an electric motor for operating said reciprocating motor, (E) an electric circuit and manually operated switch means for controlling said electric motor for controlling said reciprocating motor intermediate the limits of travel of said platform relative to said frame, and (F) a limit switch means for stopping the operation of said reciprocating motor when said platform is in its highest horizontal position between its limits of travel in a horizontal position, and manual switch means for overriding said limit switch to fold said platform into its vertical position;

the improvement comprising:

(1) vertical slot means between said cylinder and said frame for supporting said reciprocating motor and said platform in said frame, (2) microswitch means mounted on said frame adjacent said reciprocating motor, (3) cam means on said cylinder for operating said microswitch means when said reciprocating motor is raised in said vertical slot means caused by an obstruction in the downward path of movement of said platform from its vertical folded position through is highest horizontal position to its lowest horizontal position, and (4) means responsive to the operation of said microswitch means for controlling said reciprocating motor to discontinue further downward movement of said reciprocating motor.

2. A fluid-operated lift according to claim 1 including means for urging said reciprocating motor and said platform toward the lower end of said vertical slot means.

3. A fluid-operated lift according to claim 1 wherein the frame is mounted in a vehicle.

* * * * *